No. 734,410. PATENTED JULY 21, 1903.
M. N. EDWARDS.
BELT FASTENER.
APPLICATION FILED NOV. 10, 1902.
NO MODEL.
Fig. 1.
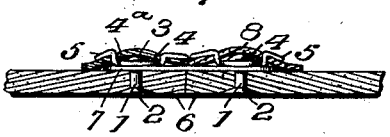
Fig. 1a.
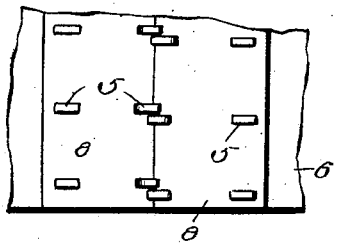
Fig. 2.
Fig. 3.
Fig. 4.
Fig. 5.
Fig. 6.
Witnesses
Inventor
M. N. Edwards
By
Attorney No. 734,410. Patented July 21, 1903.

UNITED STATES PATENT OFFICE.

MILO N. EDWARDS, OF GLENWOOD SPRINGS, COLORADO.

BELT-FASTENER.

SPECIFICATION forming part of Letters Patent No. 734,410, dated July 21, 1903.

Application filed November 10, 1902. Serial No. 130,787. (No model.)

*To all whom it may concern:*

Be it known that I, MILO N. EDWARDS, of Glenwood Springs, in the county of Garfield and State of Colorado, have invented certain new and useful Improvements in Belt-Fasteners; and I do hereby declare the following to be a full, clear, and exact description of the invention, such as will enable others skilled in the art to which it appertains to make and use the same.

This invention relates to that class of belt-fasteners designed to permit of removal in order to separate the ends of the belt at the splice.

The object of the invention is to provide an improved rivet having a retaining member which may be conveniently broken away to permit the ready removal of the rivet, and a further object is to provide the retaining member of a belt-fastener with means for securing to the belt a covering to prevent injuring pulleys or band-wheels with which the belt may engage.

The invention will be hereinafter fully set forth, and particularly pointed out in the claims.

In the accompanying drawings, Figure 1 is a sectional view showing a belt spliced and fastened and the fastener covered in accordance with my invention. Fig. 1ª is a top plan view thereof. Fig. 2 is a view of the rivet. Fig. 3 is a view of the retaining member. Fig. 4 shows a slight modification. Fig. 5 shows the fastener-plate. Fig. 6 is a view of a modified fastening means.

Referring to the drawings, 1 designates a rivet having a flat head 2 and a shank 3 tapered from about midway of its length. The retaining member 4 consists of a circular disk having a central aperture through which the rivet-shank is passed, the disk being seated at or near the inner end of such tapered portion. The shank, after the disk is in position, is set or mashed, as customary, to retain the disk in place, the latter serving to secure the rivet.

The peripheral edge of the disk 4 is beveled inwardly on the inner side thereof, as shown at 4ª. The object of this construction is to permit of the ready insertion of a suitable tool or clipper back of the retaining-disk, so that the rivet may be severed at a point in rear of the retainer. A quick pull or turn of the tool will break the rivet and permit of its withdrawal.

From opposite points on the periphery of the disk 4 project lateral arms 5, pointed or sharpened at their outer free ends. As shown in Fig. 3, these arms are bent upwardly at right angles to the plane of the disk, although, for convenience, they may be straight until desired for use, when they may be so bent by pincers. The object of these arms is to pierce and hold in place a suitable covering 8, extending over the ends of the rivets and their retainers and serving to protect a pulley or band-wheel from injury.

When assembling the parts after the manner shown in Fig. 1, the edges of the belt 6 are brought together and holes punched through each piece in alinement with the holes in the ordinary fastener-plate 7. This plate being then positioned, the rivets are inserted from the opposite side of the belt and disks 4 passed over their pointed ends. The rivets are then mashed or "set" in any well-known manner, the plate and belt ends being held between the heads and the retaining members of the rivets. The cover 8, of leather or other preferred material, is then placed over the seam, suitable slits being formed therein to accommodate the arms 5, which are then bent to retain the cover in place.

It is often necessary to shorten a belt which has become stretched from wear, and the preferred manner of doing this is to remove the fastener and cut off a sufficient length of the belt and again unite the ends. By my invention not only is this rendered easy of accomplishment, but it may be done without injury to the fastener-plate. The arms 5 are bent upward and the cover 8 removed, after which a suitable tool is inserted back of the beveled edge of disk 4 and the rivet severed between the disk and the plate 7, and the rivet-shank being of less diameter than the hole in the plate the rivet may readily fall or be removed.

When the cover 8 is not necessary or desirable, arms 5 may be dispensed with. (See Fig. 4.) It is also desirable under certain circumstances to dispense with the fastener-plate 7. To do this, I overlap the meeting edges of the belt-sections and employ washers 9 in lieu of the plate 7, as shown in Fig. 6. It will be understood that in this form and that shown in Fig. 4 the shape of the retaining members is the same as shown in the other figures and described with relation thereto.

The advantages of my invention are apparent to those skilled in the art. It will be noted that by so constructing the retaining members as to permit a rivet-securing tool to be inserted back of it the rivet may be readily cut to effect the removal of the retainer and permit the united parts to be quickly and easily separated.

I claim as my invention—

1. The herein-described belt-fastener, comprising a rivet, a retaining-disk through which the rivet is passed, and a metallic member between the belt and the disk, such disk forming between itself and the metallic member a continuous circumferential space to accommodate a tool by which the rivet may be severed, as set forth.

2. The herein-described belt-fastener, comprising a rivet, a retaining-disk through which the rivet is passed, and a metallic member between the belt and the disk, such disk having its peripheral edge beveled inwardly to form a continuous circumferential space between itself and the metallic member to accommodate a tool by which the rivet may be severed, as set forth.

3. The herein-described belt-fastener comprising a rivet, and a retaining-disk, said disk being provided with arms and a cover held by such arms, as and for the purpose set forth.

4. In a belt-fastener, the combination with the perforated plates spanning meeting belt ends, of rivets passed through said plates, retaining-disks on said rivets, said disks having arms, and a covering designed to be held by said arms, substantially as set forth.

5. The herein-described belt-fastener comprising a rivet, and a retaining-disk, said disk being beveled around its periphery, and arms or lugs projecting from the sides of said disk, as and for the purpose set forth.

In testimony whereof I have signed this specification in the presence of two subscribing witnesses.

MILO N. EDWARDS.

Witnesses:
A. L. BEARDSLEY,
E. E. DRACH.